US010776997B2

United States Patent
Schmalstieg et al.

(10) Patent No.: US 10,776,997 B2
(45) Date of Patent: Sep. 15, 2020

(54) RENDERING AN IMAGE FROM COMPUTER GRAPHICS USING TWO RENDERING COMPUTING DEVICES

(71) Applicant: QUALCOMM Incorporated, San Diego, CA (US)

(72) Inventors: Dieter Schmalstieg, Graz (AT); Gerhard Reitmayr, San Diego, CA (US); Serafin Diaz Spindola, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/685,770

(22) Filed: Aug. 24, 2017

(65) Prior Publication Data

US 2019/0066370 A1  Feb. 28, 2019

(51) Int. Cl.
| | |
|---|---|
| G06T 15/80 | (2011.01) |
| G06F 9/50 | (2006.01) |
| G06T 15/00 | (2011.01) |
| G06T 15/20 | (2011.01) |
| G06T 15/40 | (2011.01) |
| G06T 11/00 | (2006.01) |

(Continued)

(52) U.S. Cl.
CPC ............ *G06T 15/80* (2013.01); *G06F 9/5066* (2013.01); *G06T 11/001* (2013.01); *G06T 15/005* (2013.01); *G06T 15/04* (2013.01); *G06T 15/20* (2013.01); *G06T 15/40* (2013.01); *G06T 15/60* (2013.01)

(58) Field of Classification Search
None
See application file for complete search history.

(56) References Cited

U.S. PATENT DOCUMENTS

2010/0134494 A1* 6/2010 Lim ...................... G06T 9/001
345/426
2011/0149072 A1* 6/2011 McCormack ...... G08B 13/1963
348/143

(Continued)

FOREIGN PATENT DOCUMENTS

EP  3046079 A1  7/2016
EP  3166078 A1  5/2017

OTHER PUBLICATIONS

Sitthi-Amorn et al., "An Improved Shading Cache for Modern GPUs", Proceedings of the 23rd ACM SIGGRAPH/EUROGRAPHICS symposium on Graphics Hardware, Sarajevo, Bosnia and Herzegovina, Jun. 20-21, 2008, 7 pp.

(Continued)

*Primary Examiner* — Frank S Chen
(74) *Attorney, Agent, or Firm* — Shumaker & Sieffert, P.A.

(57) ABSTRACT

An example system includes a first computing device comprising a first graphics processing unit (GPU) implemented in circuitry, and a second computing device comprising a second GPU implemented in circuitry. The first GPU is configured to determine graphics primitives of a computer graphics scene that are visible from a camera viewpoint, generate a primitive atlas that includes data representing the graphics primitives that are visible from the camera viewpoint, and shade the visible graphics primitives in the primitive atlas to produce a shaded primitive atlas. The second GPU is configured to render an image using the shaded primitive atlas.

26 Claims, 6 Drawing Sheets

(51) Int. Cl.
G06T 15/04 (2011.01)
G06T 15/60 (2006.01)

(56) References Cited

U.S. PATENT DOCUMENTS

| | | | |
|---|---|---|---|
| 2011/0304634 | A1 | 12/2011 | Urbach |
| 2013/0124187 | A1* | 5/2013 | Qin .......................... G06F 3/01 704/8 |
| 2013/0286034 | A1 | 10/2013 | Diard |
| 2014/0176549 | A1 | 6/2014 | Uralsky |
| 2014/0267259 | A1 | 9/2014 | Frascati et al. |
| 2015/0154051 | A1 | 6/2015 | Kruglick et al. |
| 2015/0287158 | A1 | 10/2015 | Cerny et al. |
| 2015/0287230 | A1 | 10/2015 | Cerny |
| 2015/0347107 | A1 | 12/2015 | Munshi et al. |
| 2016/0212370 | A1* | 7/2016 | Lee .................... H04N 5/44591 |
| 2016/0240000 | A1 | 8/2016 | Fishwick |
| 2017/0011487 | A1 | 1/2017 | Billyard |
| 2017/0115728 | A1* | 4/2017 | Park .................... G02B 27/0093 |
| 2017/0150127 | A1* | 5/2017 | High ........................ G06F 3/011 |
| 2017/0155885 | A1 | 6/2017 | Selstad |
| 2018/0108169 | A1* | 4/2018 | Miller ..................... G06T 15/08 |
| 2018/0357794 | A1* | 12/2018 | Young ....................... G06T 1/20 |

OTHER PUBLICATIONS

Sitthi-Amorn et al., "Automated Reprojection-Based Pixel Shader Optimization", ACM SIGGRAPH Conference Proceedings, ACM Trans. Graph. 27 (2008): 127:1-127:11, 10 pp.
Andersson et al., "Adaptive Texture Space Shading for Stochastic Rendering", Computer Graphics Forum Proceedings of Eurographics 2014, 10 pp.
Sun et al, "An Overview of Free Viewpoint Depth-Image-Based Rendering (DIBR)", The Hong Kong University of Science and Technology, Proceedings of the Second APSIPA Annual Summit and Conference, Biopolis, Singapore, Dec. 14-17, 2010, 8 pp.
Burns et al., "A Lazy Object-Space Shading Architecture With Decoupled Sampling", In Proceedings of the Conference on High Performance Graphics, Eurographics Association 2010, Aire-la-Ville, Switzerland, Switzerland, HPG '10, 10 pp.
Carr et al., "Meshed Atlases for Real-Time Procedural Solid Texturing", University of Illinois, Urbana-Champaign, ACM Transactions on Graphics, vol. 21, No. 2, Apr. 2002, 26 pp.
Clarberg et al., "A Sort-based Deferred Shading Architecture for Decoupled Sampling", ACM Transactions on Graphics (Proceedings of SIGGRAPH 2013) 2013, vol. 32, No. 4, art. 141, Jul. 2013, 10 pp.
Clarberg et al., "AMFS: Adaptive Multi-Frequency Shading for Future Graphics Processors", ACM Transactions on Graphics (Proceedings of SIGGRAPH 2014), vol. 33(4), Aug. 2014, 12 pp.
Fatahalian et al., "Reducing Shading on GPUs using Quad-Fragment Merging", ACM Trans. Graph. vol. 29, Jul. 2010, 8 pp.
"Efficient Hybrid Image Warping for High Frame-Rate Stereoscopic Rendering", IEEE Transactions on Visulaization and Computer Graphics, Jan. 25, 2017, vol. 23, Issue 4, Apr. 2017, 10 pp.
Halle, "Multiple Viewpoint Rendering", Proceedings of the ACM SIGGRAPH Conference on Computer Graphics, 1998, 12 pp.
Harada et al., "Forward+: Bringing Deferred Lighting to the Next Level", Advanced Micro Devices, Inc., Computer Graphics forum, vol. 0 (1981), No. 0, 2012 The Eurographics Association and Blackwell Publishing Ltd., 4 pp.
Hasselgren et al., "Efficient Depth Buffer Compression", Proceeding GH '06 of the 21st ACM SIGGRAPH/EUROGRPAHISC Symposium on Graphics Hardware, 2006, The Eurographics Association 2006, 8 pp.
Hasselgren et al., "An Efficient Multi-View Rasterization Architecture," Proceedings of the 17th Eurographics Conference on Rendering Techniques, Jun. 26, 2006, 12 pp.

He et al., "Extending the Graphics Pipeline with Adaptive, Multi-Rate Shading", ACM Transactions on Graphics, vol. 33, No. 4, 2014,12 pp.
Hillesland et al., "Texel Shading", Advanced Micro Devices, Inc., Eurographics Proceedings, The Eurographics Association 2016, 4 pp.
Liktor et al., "Decoupled Deferred Shading for Hardware Rasterization", Computer Graphics Group/Karlsruhe Institute of Technology, Proceedings of the 2012 Symposium on Interactive 3D Graphics and Games, Mar. 9, 2012, 8 pp.
McGuire et al., "Real-time Stochastic Rasterization on Conventional GPU Architectures", The Eurographics Association 2010, In High Performance Graphics, 2010, 10 pp.
Nilsson et al., "Design and Novel Uses of Higher-Dimensional Rasterization", Eurographics Association, EGGH-HPG '12 Proceedings of the Fourth ACM SIGGRAPH / Eurographics Conference on High-Performance Graphics, Jun. 25, 2012, 11 pp.
Patney et al., "Towards Foveated Rendering for Gaze-Tracked Virtual Reality", NVIDIA, ACM SA '16 Technical Papers, Macao, Dec. 5-8, 2016, 12 pp.
Ragan-Kelley et al., "Decoupled Sampling for Graphics Pipelines", ACM Transactions on Graphics, vol. 30, Issue 3, Article No. 17, Mar. 2011, 17 pp.
Vaidyanathan et al., "Coarse Pixel Shading", High-Performance Graphics, The Eurographics Association 2014,10 pp.
Yang et al., "Amortized Supersampling", [online] [Retrieved on Mar. 10, 2017]; Retrieved from the Internet URL: http://www.cs.virginia.edu/~gfx/pubs/Yang-2009-AMS/yang2009.pdf, 12 pp.
Cohen-Or et al., "Deep Compression for Streaming Texture Intensive Animations" Proceedings of the SIGGRAPH 1999 annual conference on Computer graphics, 1999, 7 pp.
Decoret et al., "Multilayered impostors for Accelerated Rendering", Computer Graphics Forum, The Eurographics Association and Blackwell Publishers 1999, 18(3):61-73, 1999, 7 pp.
Ellis et al., "SVGPU: Real Time 3D Rendering to Vector Graphics Formats", High Performance Graphics (2016), The Eurographics Association 2016, 9 pp.
Guenter et al., "Foveated 3D Graphics", In Proceedings of ACM Transactions on Graphics, vol. 31, No. 6, Nov. 20, 2012, 10 pp.
Lengyel et al., "Rendering with coherent layers", In Proceedings of the 24th annual conference on Computer graphics and interactive techniques (SIGGRAPH '97). ACM Press/Addison-Wesley Publishing Co., New York, NY, USA, 233-242. 1997, 10 pp.
Lochmann et al., "Real-time Reflective and Refractive Novel-view Synthesis", Vision, Modeling and Visualization (2014), The Eurographics Association 2014, 8 pp.
Mara et al., "Deep G-Buffers for Stable Global Illumination Approximation", High Performance Graphics (2016), Eurographics Proceedings, 2016 The Eurographics Association, Dec. 5, 2017, 15 pp.
Mark et al., "Post-rendering 3D warping", In Proceedings of the 1997 Symposium on Interactive 3D graphics, I3D '97, 1997, 10 pp.
Pajak et al., "Scalable Remote Rendering with Depth and Motion-flow Augmented Streaming", Eurographics, vol. 30 (2011), No. 2, Mar. 2011, 10 pp.
Began et al., "Priority rendering with a virtual reality address recalculation pipeline", Computer Graphics Proceedings (SIGGRAPH 94), 1994, 8 pp.
Snyder et al., "Visibility sorting and compositing without splitting for image layer decompositions", In Proceedings of the 25th annual conference on Computer graphics and interactive techniques (SIGGRAPH '98), 1994, 12 pp.
Saito et al., "Comprehensible rendering of 3-D shapes", Computer Graphics: Proc. SIGGRAPH 24:4 (1990), 197-206, 10 pp.
IEEE 802.11ad, "IEEE Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications—Amendment 3: Enhancements for Very High Throughput in the 60 GHz Band", IEEE Computer Society, Dec. 28, 2012, 628 pp.
Baxter III W.V., et al., "GigaWalk: Interactive Walkthrough of Complex Environments", Eurographics Rendering Workshop, 2002, Jul. 1, 2002, XP002784998, 15 pages.

(56) References Cited

OTHER PUBLICATIONS

International Search Report and Written Opinion—PCT/US2018/043578—ISA/EPO—dated Oct. 8, 2018.

* cited by examiner

RENDERING AN IMAGE FROM COMPUTER GRAPHICS USING TWO RENDERING COMPUTING DEVICES

TECHNICAL FIELD

This disclosure relates to rendering an image from computer graphics data.

BACKGROUND

Visual content for display, such as content for graphical user interfaces and video games, may be generated by a graphics processing unit (GPU). A GPU may convert two-dimensional or three-dimensional (3D) objects defined by graphical primitives (e.g., points, lines, and triangles) into a two-dimensional (2D) pixel bit representation, such as a bit map, that may be displayed. Converting 3D object information into a bit map that can be displayed is known as pixel rendering, and requires considerable memory and processing power. In the past, 3D graphics capability was available only on powerful workstations. However, now 3D graphics accelerators are commonly found in personal computers (PC), as well as in in embedded devices, such as smart phones, tablet computers, portable media players, portable video gaming consoles, and the like.

Three-dimensional display technologies are now being used to provide 3D content for virtual reality (VR) and augmented reality. For example, a VR headset may include two displays, a left-eye display and a right-eye display, to present a stereoscopic image pair to a wearer of the VR headset, to produce a 3D effect from the image pair. In general, the VR headset may produce the 3D effect by presenting images from slightly different horizontal perspectives, which simulates the horizontal offset between a user's eyes for binocular vision. In this manner, the VR headset presents the stereoscopic image pair to cause the user's visual system to perceive the two images in 3D.

SUMMARY

In general, this disclosure describes techniques for rendering an image from computer graphics data. In particular, according to the techniques of this disclosure, a graphics processing unit (GPU) of a server device may determine graphics objects (e.g., graphics primitives, such as triangles) that are visible from a particular camera perspective. The GPU may then shade only the graphics objects that are visible. The GPU may store the graphics objects that are visible in a primitive atlas (sometimes also referred to herein as a texture atlas). The server device may then send the primitive atlas to a client device, such as a virtual reality (VR) headset device. A GPU of the client device may then warp image data of the texture atlas, e.g., to form a stereoscopic image pair to be displayed, to generate a three-dimensional (3D) effect for a user of the client device.

In one example, a method of generating computer graphics includes determining, by a first graphics processing unit (GPU) of a first computing device, graphics primitives of a computer graphics scene that are visible from a camera viewpoint, generating, by the first GPU, a primitive atlas that includes data representing the graphics primitives that are visible from the camera viewpoint, shading, by the first GPU, the visible graphics primitives in the primitive atlas to produce a shaded primitive atlas, sending, by the first computing device, the shaded primitive atlas to a second computing device, and rendering, by a second GPU of the second computing device, an image using the shaded primitive atlas.

In another example, a system for generating computer graphics includes a first computing device comprising a first graphics processing unit (GPU) implemented in circuitry, and a second computing device comprising a second GPU implemented in circuitry. The first GPU is configured to determine graphics primitives of a computer graphics scene that are visible from a camera viewpoint, generate a primitive atlas that includes data representing the graphics primitives that are visible from the camera viewpoint, and shade the visible graphics primitives in the primitive atlas to produce a shaded primitive atlas. The second GPU is configured to render an image using the shaded primitive atlas.

In another example, system for generating computer graphics includes a first computing device and a second computing device. The first computing device comprises means for determining graphics primitives of a computer graphics scene that are visible from a camera viewpoint, means for generating a primitive atlas that includes data representing the graphics primitives that are visible from the camera viewpoint, means for shading the visible graphics primitives in the primitive atlas to produce a shaded primitive atlas, and means for sending the shaded primitive atlas to a second computing device. The second computing device comprises means for rendering an image using the shaded primitive atlas.

In another example, a computer-readable storage medium has stored thereon instructions that, when executed, cause a graphics processing unit (GPU) to determine graphics primitives of a computer graphics scene that are visible from a camera viewpoint, generate a primitive atlas that includes data representing the graphics primitives that are visible from the camera viewpoint, shade the visible graphics primitives in the primitive atlas to produce a shaded primitive atlas, and send the shaded primitive atlas to a second computing device.

The details of one or more examples are set forth in the accompanying drawings and the description below. Other features, objects, and advantages will be apparent from the description and drawings, and from the claims.

DETAILED DESCRIPTION

Figure 1:
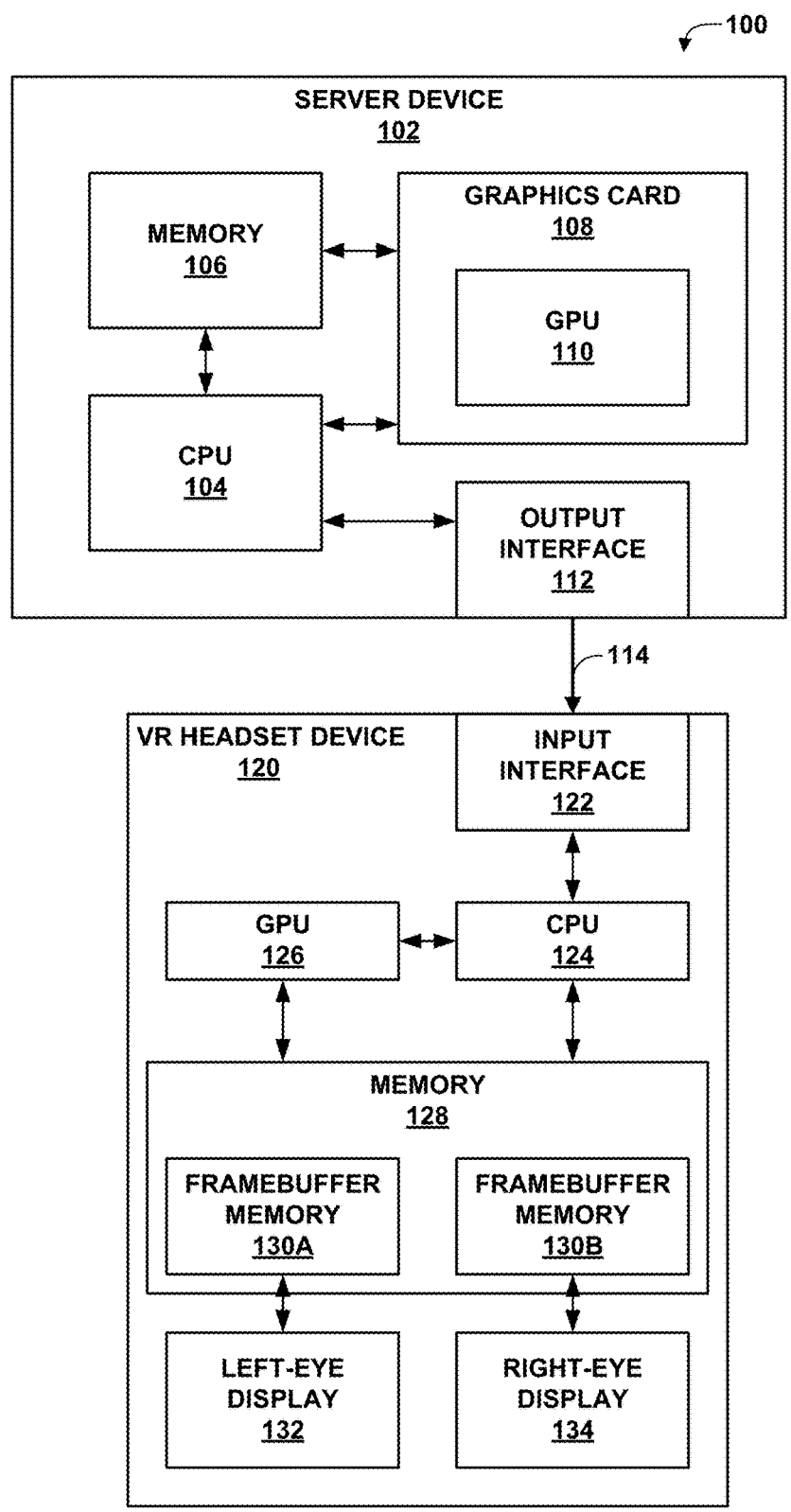
FIG. 1 is a block diagram illustrating an example system including two computing devices, a server device and a virtual reality (VR) headset device, that may perform the techniques of this disclosure.

FIG. 1 is a block diagram illustrating an example system 100 including two computing devices, server device 102 and virtual reality (VR) headset device 120, that may perform the techniques of this disclosure. Server device 102 includes central processing unit (CPU) 104, memory 106, graphics card 108, and output interface 112. Graphics card 108 includes graphics processing unit 110. VR headset device 120 includes input interface 122, CPU 124, GPU 126, memory 128, left-eye display 132, and right-eye display 134. Memory 128 includes framebuffer memories 130A, 130B (framebuffer memories 130). Although not shown in the example of FIG. 1, server device 102 may also include or be coupled to one or more displays.

Server device 102 is referred to as a "server" in the sense that server device 102 provides intermediate graphics data to VR headset device 120 via communication medium 114. Communication medium 114 may correspond to a physical communication medium, such as a high-definition multimedia interface (HDMI) cable, a universal serial bus (USB) cable, or a DisplayPort cable, or a wireless communication medium, such as Bluetooth or WiFi according to IEEE 802.11. Server device 102 may correspond to, for example, a video game console, a personal computer, smart phone, or tablet computing device executing a video game or other three-dimensional (3D) graphics program.

VR headset device 120 represents an example of a VR headset for presenting stereoscopic image pairs to a wearer of VR headset device 120. The stereoscopic image pair may include a left-eye image, which VR headset device 120 presents via left-eye display 132, and a right-eye image, which VR headset device 120 presents via right-eye display 134.

CPUs 104, 124 may be implemented in circuitry (e.g., digital logic circuitry). CPUs 104, 124 may also represent single respective processors, or multi-processor (e.g., multi-core) CPUs. CPUs 104, 124 may further include internal cache memory, e.g., any or all of an L1, L2, and/or L3 caches, and/or additional caches.

CPU 104 may execute a computer graphics-generating program, such as a video game, ray tracing program, animation program, or the like. CPU 104 may generate one or more graphics primitives (e.g., vertices, lines, triangles, or the like), as well as characteristics for objects defined by the primitives (e.g., texture images to be applied to the objects, position data defining relative positions of the objects, illumination characteristics, etc.), through generation of this graphics program. CPU 104 may also define one or more camera positions, generally corresponding to the position of the screen/display at which images rendered from the graphics primitives are to appear. Such generated data may generally be referred to as graphics data.

CPU 104 may then send the graphics data to graphics card 108 for rendering. CPU 104 may send the graphics data to graphics card 108 directly, or may store some or all of the graphics data to memory 106 and cause graphics card 108 to retrieve the graphics data from memory 106 (e.g., by storing the graphics data to a region of memory 106 allocated to graphics card 108). In some examples, a CPU and GPU, such as CPU 104 and GPU 110, may form part of a system on a chip (SoC), which may perform the techniques of this disclosure.

Graphics card 108 may cause GPU 110 to initiate a rendering process to begin rendering an image from the graphics data. In accordance with the techniques of this disclosure, GPU 110 may perform only a first part of an image rendering process, e.g., a graphics processing pipeline (also referred to simply as a graphics pipeline). The graphics processing pipeline generally includes various stages, such as an application stage (performed by CPU 104, in this example), a geometry stage, a rasterization stage, and a framebuffer stage.

The images stored to framebuffer memories 130A, 130B constitute a stereoscopic image pair. Thus, VR headset device 120 may display the images of the stereoscopic image pair via left-eye display 132 and right-eye display 134. In the example of FIG. 1, VR headset device 120 displays images in framebuffer memory 130A via left-eye display 132 and images in framebuffer memory 130B via right-eye display 134.

In some examples, server device 102 and VR headset device 120 may be configured to perform foveated rendering. In foveated rendering, lens optics in VR headsets (such as lens optics of left-eye display 132 and right-eye display 134) enlarge peripheral image regions in a user's field of view. This disclosure recognizes that it is wasteful to render more pixels than will be used in the final image. Thus, GPUs according to this disclosure (such as GPUs 110, 126) may sample pixels in the center of an image relatively more densely than pixels in the periphery of the image.

In this manner, the techniques of this disclosure may combine GPU power from both server device 102 and VR headset device 120 (representing an example of a client device). GPU 110 of server device 102 may be more powerful than GPU 126 of VR headset device 120. The techniques of this disclosure may avoid the necessity of GPU 110 rendering both images and sending both images to VR headset device 120. Thus, the techniques of this disclosure may improve the processing efficiency of GPU 110, and reduce bandwidth consumed by transmissions via communication medium 114. These techniques may also avoid performance bottlenecks that may otherwise result from rendering the stereoscopic image pair images fully at server device 102, especially when such images are rendered at ultra-high resolutions (e.g., 4K resolution). Furthermore, these techniques may allow server device 102 to render a lower-resolution image, which VR headset device 120 may upsample to a higher-resolution image without aliasing, because VR headset device 120 may perform its own rasterization. Thus, server device 102 may execute relatively computationally expensive shader programs for the lower-resolution image and transmit only lower-resolution textures via In some examples, server device 102 (and in particular, GPU 110) may compute a list of visible triangles (a potentially visible set (PVS)). GPU 110 may then shade visible triangles into a texture atlas as part of object space rendering. Server device 102 may then stream pre-shaded triangles of the texture atlas to VR headset device 120 incrementally, via output interface 112. GPU 110 may perform this portion of the rendering process using a graphics API, such as OpenGL or DirectX, or CUDA, which allows GPU 110 to be programmed to perform general purpose processing in addition to graphics processing.

In examples in which server device 102 streams pre-shaded triangles of a texture atlas to VR headset device 120, VR headset device 120 receives the texture atlas via input interface 122. GPU 126 may render one or more images from the pre-shaded triangles of the texture atlas. For example, GPU 126 may render a stereoscopic image pair from the pre-shaded triangles of the texture atlas.

GPU 104 may perform a visibility pass as part of the rendering process for rendering one or more images. The visibility pass may include deferred shading. During deferred shading, GPU 104 may compute visible triangles of the texture atlas before shading the visible triangles. GPU 104 may incorporate determination of potentially visible set (PVS) estimation into deferred shading, which may support Six Degrees of Freedom (6DOF) (i.e., movement in three-dimensional space forward, backward, up, down, left, or right, combined with rotation about the three spatial axes for pitch, yaw, and roll).

In some examples, GPU 104 may perform the visibility pass by writing the result to a G-buffer. The visibility pass process may be easily integrated into existing DirectX and/or OpenGL graphics processing pipelines. In such examples, GPU 104 may identify visible triangles and then storing the result to the G-buffer. In a first pass, GPU 104 may render an id-buffer with a depth buffer enabled. In a second pass, GPU 104 may reduce the id buffer to produce a triangle list. GPU 126 may estimate the potentially visible set (PVS) as a superset of visible triangles.

These techniques of using a texture atlas may provide enhanced scalability in terms of client-side resolution, and may better use bandwidth of communication medium 114 (e.g., WiFi). These techniques may further support six degrees of freedom (6DOF) at VR headset device 120, or other client devices configured to perform these techniques.

Figure 2:
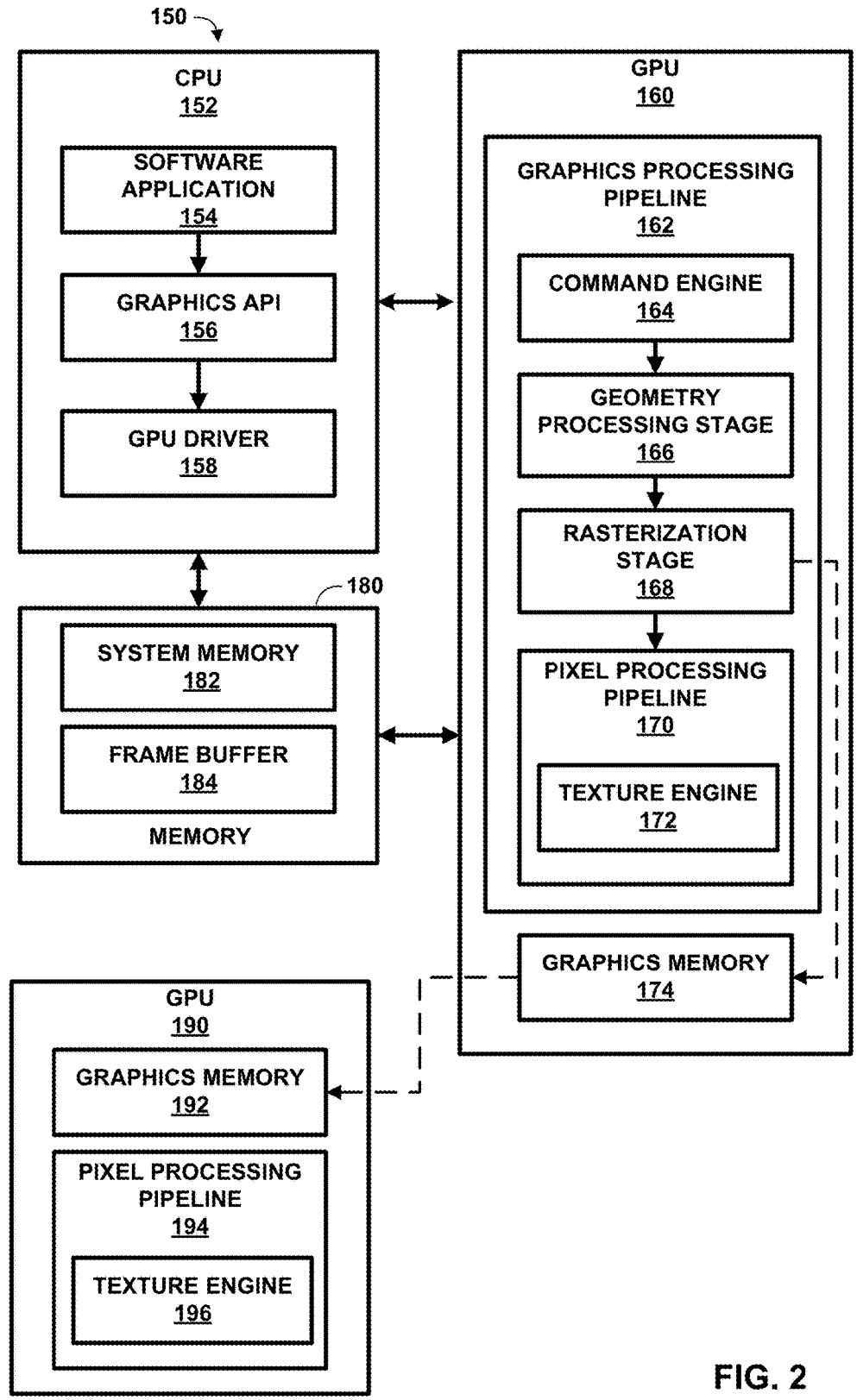
FIG. 2 is a block diagram illustrating a system including example implementations of a central processing unit (CPU), graphics processing units (GPUs), and memory.

FIG. 2 is a block diagram illustrating a system 150 including example implementations of CPU 152, GPU 160, memory 180, and GPU 190. In this example, CPU 152, GPU 160, and memory 180 are included in a server device, while GPU 190 is included in a client device. It should be understood that the client device may further include a CPU and memory as shown in FIG. 1, but the CPU and memory of the client device are not shown in FIG. 2, for ease of illustration. CPU 152, GPU 160, and memory 180 of FIG. 2 may correspond, respectively, to CPU 104, GPU 110, and memory 106 of FIG. 1, while GPU 190 of FIG. 2 may correspond to GPU 126 of FIG. 1.

In this example, CPU 152 executes software application 154, graphics API 156, and GPU driver 158, each of which may be one or more software applications or services. In this example, GPU 160 includes graphics processing pipeline 162 that includes a plurality of graphics processing stages that operate together to execute graphics processing commands. GPU 160 may be configured to execute graphics processing pipeline 162 in a variety of rendering modes, including a binning rendering mode and a direct rendering mode.

As shown in FIG. 2, graphics processing pipeline 162 may include command engine 164, geometry processing stage 166, rasterization stage 168, and pixel processing pipeline 170. Pixel processing pipeline 170 may include texture engine 172. Each of the components in graphics processing pipeline 162 may be implemented as fixed-function components, programmable components (e.g., as part of a shader program executing on a programmable shader unit), or as a combination of fixed-function and programmable components. Memory 180, available to CPU 152 and GPU 160, may include system memory 182 and frame buffer 184. Frame buffer 184 may be a part of system memory 182 or may be separate from system memory 182. Frame buffer 184 may store rendered image data.

Software application 154 may be any application that utilizes the functionality of GPU 160. For example, software application 154 may be a GUI application, an operating system, a portable mapping application, a computer-aided design program for engineering or artistic applications, a video game application, or another type of software application that may utilize a GPU. In some examples, software application 154 may represent a virtual reality (VR) application, e.g., a VR video game, or an augmented reality (AR) application. Thus, software application 154 may send data representing a user's viewpoint (determined using any or all of external cameras, accelerometers, gyroscopes, or the like) to GPU 160 via graphics API 156 and GPU driver 158. GPU 160, in turn, may use the viewpoint data to determine one or more camera positions (e.g., a single camera position for a single image, or multiple camera positions for two images, e.g., a left-eye image and a right-eye image).

Software application 154 may include one or more drawing instructions that instruct GPU 160 to render a graphical user interface (GUI) and/or a graphics scene. For example, the drawing instructions may include instructions that define a set of one or more graphics primitives to be rendered by GPU 160. In some examples, the drawing instructions may, collectively, define all or part of a plurality of windowing surfaces used in a GUI. In additional examples, the drawing instructions may, collectively, define all or part of a graphics scene that includes one or more graphics objects within a model space or world space defined by the application.

Software application 154 may invoke GPU driver 158, via graphics API 156, to issue one or more commands to GPU 160 for rendering one or more graphics primitives into displayable graphics images. For example, software application 154 may invoke GPU driver 158, via graphics API 156, to provide primitive definitions to GPU 160. In some instances, the primitive definitions may be provided to GPU 160 in the form of a list of drawing primitives, e.g., triangles, rectangles, triangle fans, triangle strips, etc. The primitive definitions may include vertex specifications that specify one or more vertices associated with the primitives to be rendered. The vertex specifications may include positional coordinates for each vertex and, in some instances, other attributes associated with the vertex, such as, e.g., color coordinates, normal vectors, and texture coordinates.

The primitive definitions may also include primitive type information (e.g., triangle, rectangle, triangle fan, triangle strip, etc.), scaling information, rotation information, and the like. Based on the instructions issued by software application 154 to GPU driver 158, GPU driver 158 may formulate one or more commands that specify one or more operations for GPU 160 to perform in order to render the primitive. When GPU 160 receives a command from CPU 152, graphics processing pipeline 162 decodes the command and configures one or more processing elements within graphics processing pipeline 162 to perform the operation specified in the command. After performing the specified operations, graphics processing pipeline 162 outputs the rendered data to frame buffer 184 associated with a display device. Graphics processing pipeline 162 may be configured to execute in one of a plurality of different rendering modes, including a binning rendering mode and a direct rendering mode.

GPU driver 158 may be further configured to compile one or more shader programs, and to download the compiled shader programs onto one or more programmable shader units contained within GPU 160. The shader programs may be written in a high level shading language, such as, e.g., an OpenGL Shading Language (GLSL), a High Level Shading Language (HLSL), a C for Graphics (Cg) shading language, etc. The compiled shader programs may include one or more instructions that control the operation of a programmable shader unit within GPU 160. For example, the shader programs may include vertex shader programs and/or pixel shader programs. A vertex shader program may control the execution of a programmable vertex shader unit or a unified shader unit, and include instructions that specify one or more per-vertex operations. A pixel shader program may include pixel shader programs that control the execution of a programmable pixel shader unit or a unified shader unit, and include instructions that specify one or more per-pixel operations.

Graphics processing pipeline 162 may be configured to receive one or more graphics processing commands from CPU 152, via GPU driver 158, and to execute the graphics processing commands to generate displayable graphics images. As discussed above, graphics processing pipeline 162 includes a plurality of stages that operate together to execute graphics processing commands. It should be noted, however, that such stages need not necessarily be implemented in separate hardware blocks. For example, portions of geometry processing stage 166 and pixel processing pipeline 170 may be implemented as part of a unified shader unit. Again, graphics processing pipeline 162 may be configured to execute in one of a plurality of different rendering modes, including a binning rendering mode and a direct rendering mode.

Command engine 164 may receive graphics processing commands and configure the remaining processing stages within graphics processing pipeline 162 to perform various operations for carrying out the graphics processing commands. The graphics processing commands may include, for example, drawing commands and graphics state commands. The drawing commands may include vertex specification commands that specify positional coordinates for one or more vertices and, in some instances, other attribute values associated with each of the vertices, such as, e.g., color coordinates, normal vectors, texture coordinates and fog coordinates. The graphics state commands may include primitive type commands, transformation commands, lighting commands, etc. The primitive type commands may specify the type of primitive to be rendered and/or how the vertices are combined to form a primitive. The transformation commands may specify the types of transformations to perform on the vertices. The lighting commands may specify the type, direction and/or placement of different lights within a graphics scene. Command engine 164 may cause geometry processing stage 166 to perform geometry processing with respect to vertices and/or primitives associated with one or more received commands.

Geometry processing stage 166 may perform per-vertex operations and/or primitive setup operations on one or more vertices in order to generate primitive data for rasterization stage 168. Each vertex may be associated with a set of attributes, such as, e.g., positional coordinates, color values, a normal vector, and texture coordinates. Geometry processing stage 166 modifies one or more of these attributes according to various per-vertex operations. For example, geometry processing stage 166 may perform one or more transformations on vertex positional coordinates to produce modified vertex positional coordinates.

Geometry processing stage 166 may, for example, apply one or more of a modeling transformation, a viewing transformation, a projection transformation, a ModelView transformation, a ModelViewProjection transformation, a viewport transformation and a depth range scaling transformation to the vertex positional coordinates to generate the modified vertex positional coordinates. In some instances, the vertex positional coordinates may be model space coordinates, and the modified vertex positional coordinates may be screen space coordinates. The screen space coordinates may be obtained after the application of the modeling, viewing, projection and viewport transformations. In some instances, geometry processing stage 166 may also perform per-vertex lighting operations on the vertices to generate modified color coordinates for the vertices. Geometry processing stage 166 may also perform other operations including, e.g., normal transformations, normal normalization operations, view volume clipping, homogenous division and/or backface culling operations.

Geometry processing stage 166 may produce primitive data that includes a set of one or more modified vertices that define a primitive to be rasterized as well as data that specifies how the vertices combine to form a primitive. Each of the modified vertices may include, for example, modified vertex positional coordinates and processed vertex attribute values associated with the vertex. The primitive data may collectively correspond to a primitive to be rasterized by further stages of graphics processing pipeline 162. Conceptually, each vertex may correspond to a corner of a primitive where two edges of the primitive meet. Geometry processing stage 166 may provide the primitive data to rasterization stage 168 for further processing.

In some examples, all or part of geometry processing stage 166 may be implemented by one or more shader programs executing on one or more shader units. For example, geometry processing stage 166 may be implemented, in such examples, by a vertex shader, a geometry shader or any combination thereof. In other examples, geometry processing stage 166 may be implemented as a fixed-function hardware processing pipeline or as a combination of fixed-function hardware and one or more shader programs executing on one or more shader units.

Rasterization stage 168 is configured to receive, from geometry processing stage 166, primitive data that represents a primitive to be rasterized, and to rasterize the primitive to generate a plurality of source pixels that correspond to the rasterized primitive. In some examples, rasterization stage 168 may determine which screen pixel locations are covered by the primitive to be rasterized, and generate a source pixel for each screen pixel location determined to be covered by the primitive. Rasterization stage 168 may determine which screen pixel locations are covered by a primitive by using techniques known to those of skill in the art, such as, e.g., an edge-walking technique, evaluating edge equations, etc. Rasterization stage 168 may provide the resulting source pixels to pixel processing pipeline 170 for further processing.

The source pixels generated by rasterization stage 168 may correspond to a screen pixel location, e.g., a destination pixel, and be associated with one or more color attributes. All of the source pixels generated for a specific rasterized primitive may be said to be associated with the rasterized primitive. The pixels that are determined by rasterization stage 168 to be covered by a primitive may conceptually include pixels that represent the vertices of the primitive, pixels that represent the edges of the primitive and pixels that represent the interior of the primitive.

Pixel processing pipeline 170 is configured to receive a source pixel associated with a rasterized primitive, and to perform one or more per-pixel operations on the source pixel. Per-pixel operations that may be performed by pixel processing pipeline 170 include, e.g., alpha test, texture mapping, color computation, pixel shading, per-pixel lighting, fog processing, blending, a pixel ownership test, a source alpha test, a stencil test, a depth test, a scissors test and/or stippling operations. In addition, pixel processing pipeline 170 may execute one or more pixel shader programs to perform one or more per-pixel operations. The resulting data produced by pixel processing pipeline 170 may be referred to herein as destination pixel data and stored in frame buffer 184. The destination pixel data may be associated with a destination pixel in frame buffer 184 that has the same display location as the source pixel that was processed. The destination pixel data may include data such as, e.g., color values, destination alpha values, depth values, etc.

Texture engine 172 may be included as part of pixel processing pipeline 170. Texture engine 172 may include programmable and/or fixed function hardware designed to apply textures (texels) to pixels. Texture engine 172 may include dedicated hardware for performing texture filtering, whereby one or more texel values are multiplied by one or more pixel values and accumulated to produce the final texture mapped pixel.

In addition, or in the alternative, GPU 160 (or other GPUs, e.g., GPU 110 of FIG. 1) may perform texel shading techniques, as a variant of object-space shading, in accordance with techniques of this disclosure. GPU 160 may perform texel shading as part of rasterization stage 168. For example, GPU 160 may initially generate a mip-mapped texture atlas.

In a first pass for texel shading, a visibility pass, GPU 160 may mark shading work directly in the texture atlas. For example, GPU 160 may use conservative rasterization and/or slight overshading. GPU 160 may select basic mip-map levels using standard screen size measurements. GPU 160 may select mip-map level bias based on vertex normal variance, e.g., where relatively flat surfaces are given relatively less shading, and more contoured surfaces are given relatively more shading. In a second pass for texel shading, GPU 160 may execute a compute shader that bulk-executes fragment shading work. In this second pass, GPU 160 may perform spatial sub-sampling via mip-map bias, e.g., to implement foveated rendering. GPU 160 may also perform temporal subsampling via lower update rates for block shading.

Additionally or alternatively, GPU 160 may perform texel shading for vector streaming. After a visibility pass, GPU 160 may use a potentially visible set (PVS) to perform texel shading. GPU 160 may perform texel shading such that overshading always covers a complete block in the texture atlas). Overshading covering a complete block is a simple technique, but may enlarge the PVS. GPU 160 may further realize foveated rendering via a mip-map bias.

In some examples, GPU 160 may use a virtual texture atlas when performing texture shading for vector streaming. In such examples, a page table may point from triangles to blocks. GPU 160 may allocate blocks only on demand, if the corresponding triangles of the block are visible. That is, GPU 160 may allocate blocks for visible triangles, and not allocate blocks that are not visible. The memory requirements for these techniques may be proportional to a conventional framebuffer. A page table access log may directly list "dirty" blocks that have been initialized or updated with new shaded samples and must be transmitted. Blocks to be transmitted to GPU 190, in this example, are square tiles that can be easily JPEG-encoded (or encoded as MPEG I-frames).

Frame buffer 184 stores destination pixels for GPU 160. Each destination pixel may be associated with a unique screen pixel location. In some examples, frame buffer 184 may store color components and a destination alpha value for each destination pixel. For example, frame buffer 184 may store Red, Green, Blue, Alpha (RGBA) components for each pixel where the "RGB" components correspond to color values and the "A" component corresponds to a destination alpha value. Although frame buffer 184 and system memory 182 are illustrated as being separate memory units, in other examples, frame buffer 184 may be part of system memory 182.

GPU 160 also includes graphics memory 174, which may store the output of the vertex shader. In accordance with the techniques of this disclosure, GPU 160 may send output of geometry processing stage 166 to graphics memory 174, instead of to rasterization stage 168. GPU 160 may then output the vertex shader output data to GPU 190.

In such examples, CPU 152 may stream intermediate graphics data to a corresponding CPU associated with GPU 190. In one example, CPU 152 may perform triangle geometry streaming. In some examples, CPU 152 sends a triangle geometry during startup. Alternatively, CPU 152 may stream triangle geometries per-frame to GPU 190. With per-frame updates, the triangle geometry could be pre-transformed to "middle-eye" space. Thus, GPU 126 may cheaply compute left- and right-eye images of a stereoscopic image pair from a central view—the "middle-eye" perspective—using perceptive warping, or affine warping in post-perspective space.

In one example of texture atlas streaming, a list of triangles in the atlas (that is, nodes) has a time-to-live value (e.g., with exponential decay). GPU 160 may perform incremental encoding of the texture atlas. That is, GPU 160 may only shade and transmit triangles that are visible and that need a refresh relative to triangles of a previously transmitted atlas. GPU 160 may only shade graphics primitives that have changed relative to visible graphics primitives of an earlier computer graphics scene and send only the shaded visible graphics primitives that have changed. However, the time-to-live model may not be suitable for strongly view-dependent shading or animations.

As another example of texture atlas streaming, GPU 160 may perform ping-pong rendering of an entire PVS to alternating texture atlases. GPU 160 may perform incremental encoding, in which GPU 160 encodes a difference image between the atlases, thereby encoding novel shading results. Such examples result in implicitly encoding view-dependent shading effects.

GPU 190 may generally include elements similar to those of GPU 160. For example, GPU 190 may include a graphics processing pipeline similar to graphics processing pipeline 162. For purposes of explanation, only pixel processing pipeline 194 is shown in this example, but it should be understood that GPU 190 may include components similar to the other components of GPU 160. GPU 190 also includes graphics memory 192, which may buffer data from graphics memory 174.

GPU 160 may thereby avoid performing the entirety of graphics processing pipeline 162. Rasterization stage 168 need not call shaders directly. Instead, GPU 160 may store rasterization results in graphics memory 174.

In this manner, GPU 160 may perform a first portion of an image rendering process, to generate intermediate graphics data. The first portion of the image rendering process may include geometry processing stage 166 and rasterization stage 168 of graphics processing pipeline 162. GPU 160 may then store the intermediate graphics data in graphics memory 174. The intermediate graphics data may include a shaded color component. In some examples, the intermediate graphics data may further include any or all of a position component, a normals component, an albedo component, or a specular component for texture and/or depth information for a plurality of graphics objects (e.g., one or more graphics primitives). The position component may specify a position of a graphics object. The normals component may specify a local surface normal for the graphics object. The albedo component may specify surface reflectance for the graphics object. The specular component may specify a lighting highlight for the graphics object. In some examples, GPU 160 may compress the intermediate graphics data prior to sending the intermediate graphics data to GPU 190. In such examples, GPU 190 decompresses the intermediate graphics data prior to completing the rendering process.

GPU 190 receives the intermediate graphics data and buffers the intermediate graphics data in graphics memory 192. Pixel processing pipeline 194 and texture engine 196 then perform a second portion of the image rendering process to render one or more images from the intermediate graphics data. For example, pixel processing pipeline 194 may execute one or more shaders to render one or more images.

In one example, GPU 190 is included in a virtual reality or augmented reality headset including two displays, a left-eye display and a right-eye display, e.g., as shown in FIG. 1. GPU 190 may be configured to generate (e.g., render and/or warp) two images of a stereoscopic image pair (a left-eye image and a right-eye image) from the intermediate graphics data.

In some examples, GPU 190 may render pre-transformed, pre-shaded triangles with textures from a texture atlas produced by GPU 160, as discussed above. GPU 190 may use a depth buffer when performing these techniques, since GPU 190 would render a potentially visible set (PVS) with a depth complexity of greater than one. These techniques allow GPU 190 to simply support upsampling. That is, the triangles may support automatic scaling to any image resolution. If aliasing at edges of triangles is suppressed, lower resolution pre-shading is often imperceptible (imperceivable). GPU 190 thus does not need a vertex shader unit to perform these techniques, assuming a pre-transformed geometry is streamed per frame and if a limitation to affine warping is acceptable. Otherwise, GPU 190 may use a perspective transform.

GPU 190 may perform warping of a middle-eye image to generate left- and right-eye images of a stereoscopic image pair. For example, GPU 190 may use a modified projection matrix to incorporate warping effects in a single pass. GPU 190 may support six-degrees of freedom (6DOF) time warping using either affine warping or perspective warping. GPU 190 may thereby translate middle-eye image data, i.e., data from a central viewpoint, to a left and/or right eye viewpoint. GPU 190 may further transform vertices of the renderered mesh to compensate lens-distortion effects.

Figure 3:
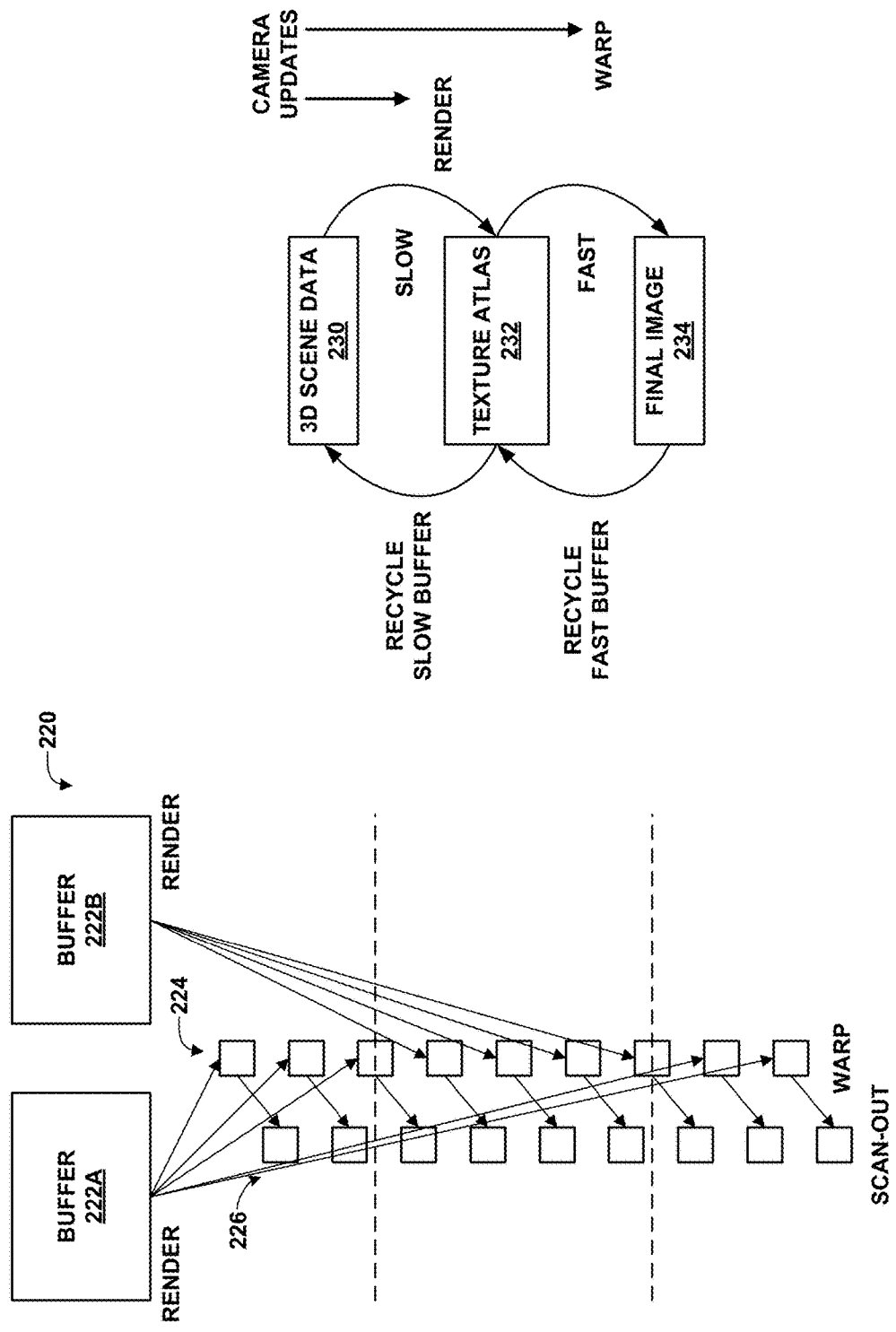
FIG. 3 is a conceptual diagram illustrating an example system for performing asynchronous image warping.

FIG. 3 is a conceptual diagram illustrating an example system 220 for performing asynchronous image warping. In asynchronous image warping, rendering of an image and display of the image may be decoupled. Asynchronous image warping may generally include two passes: a slow, first pass and a fast, second pass. During the slow, first pass, a GPU may render objects of 3D scene data 230 to an intermediate storage, e.g., texture atlas 232 (also shown as a series of atlas updates 224). The GPU may store the atlas to a first buffer, e.g., buffer 222A of FIG. 3, or a second buffer, e.g., buffer 222B of FIG. 3. During the second, fast pass, a GPU (the same GPU or a different GPU) may use the atlas to form final image 234 for a corresponding camera perspective (shown as a series of images 226). The GPU may then scan the images out to framebuffer memory (not shown in FIG. 3).

Figure 4:
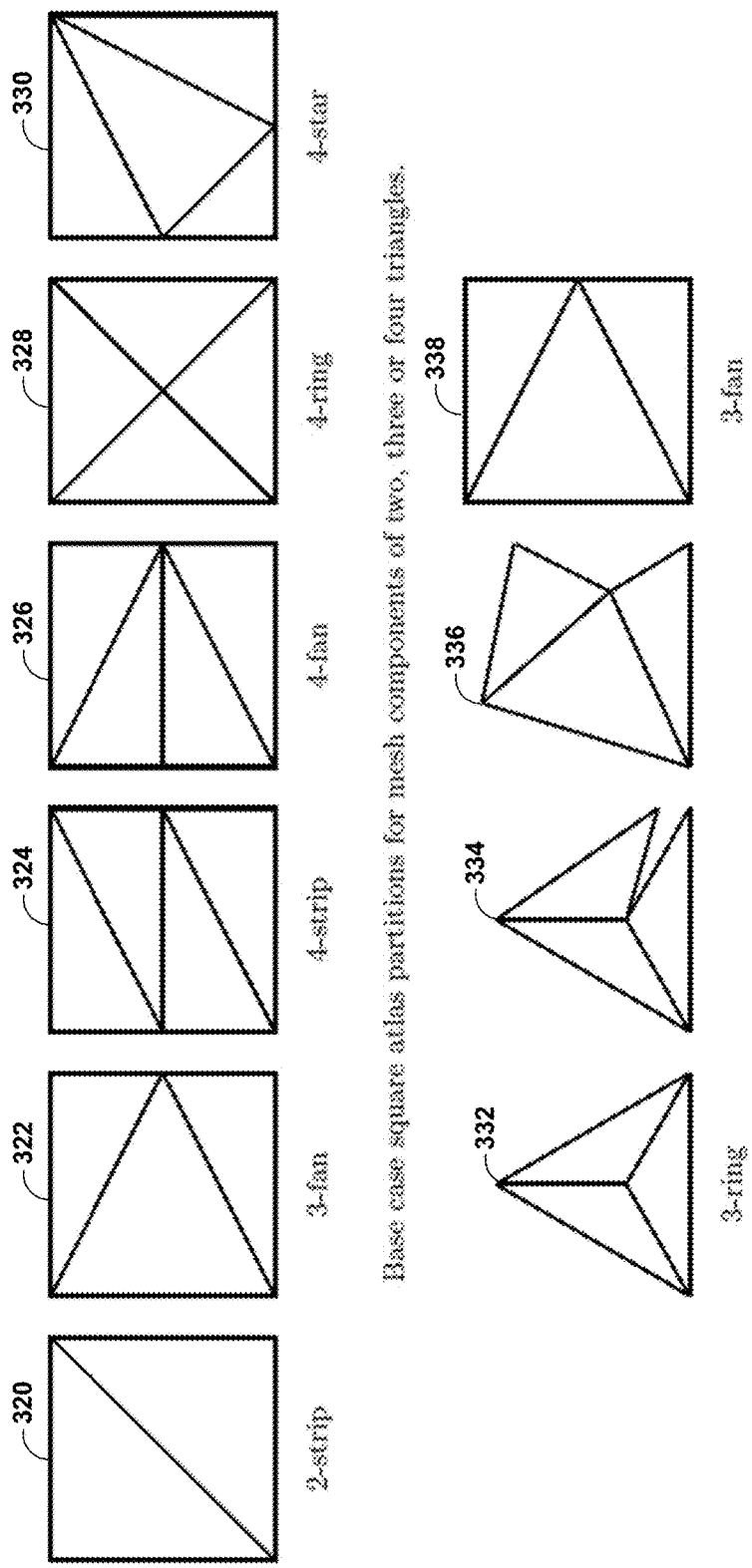
FIG. 4 is a conceptual diagram illustrating example triangle arrangements that may be included in a block of a virtual texture atlas.

FIG. 4 is a conceptual diagram illustrating example triangle arrangements that may be included in a block of a virtual texture atlas. For example, a block may include a two-strip triangle arrangement 320, a three-fan triangle arrangement 322, a four-strip triangle arrangement 324, a four-fan triangle arrangement 326, a four-ring triangle arrangement 328, or a four-star triangle arrangement 330.

FIG. 4 also illustrates an example representation of how a three-ring graphics object 332 (i.e., a three-dimensional pyramid graphics object) is represented by a two-dimensional three-fan triangle arrangement 338. In particular, intermediate graphics objects 334, 336 graphically portray the manner in which the textures applied to surfaces of three-ring graphics object 332 correspond to the triangles of two-dimensional three-fan triangle arrangement 338.

During a shading pass, server device 102 may render triangles in a potentially visible set (PVS) into a virtual texture atlas. Server device 102 may pack two, three, or four triangles into one block (a square sub-texture), e.g., as shown in the examples of FIG. 4. The block size may depend on triangle sizes and a mipmap value. Server device 102 may transmit changes to the texture atlas to VR headset device 120. In general, overshading of an entire block may increase PVS coverage. Foveated rendering may be realized via a mipmap bias.

Figure 5:
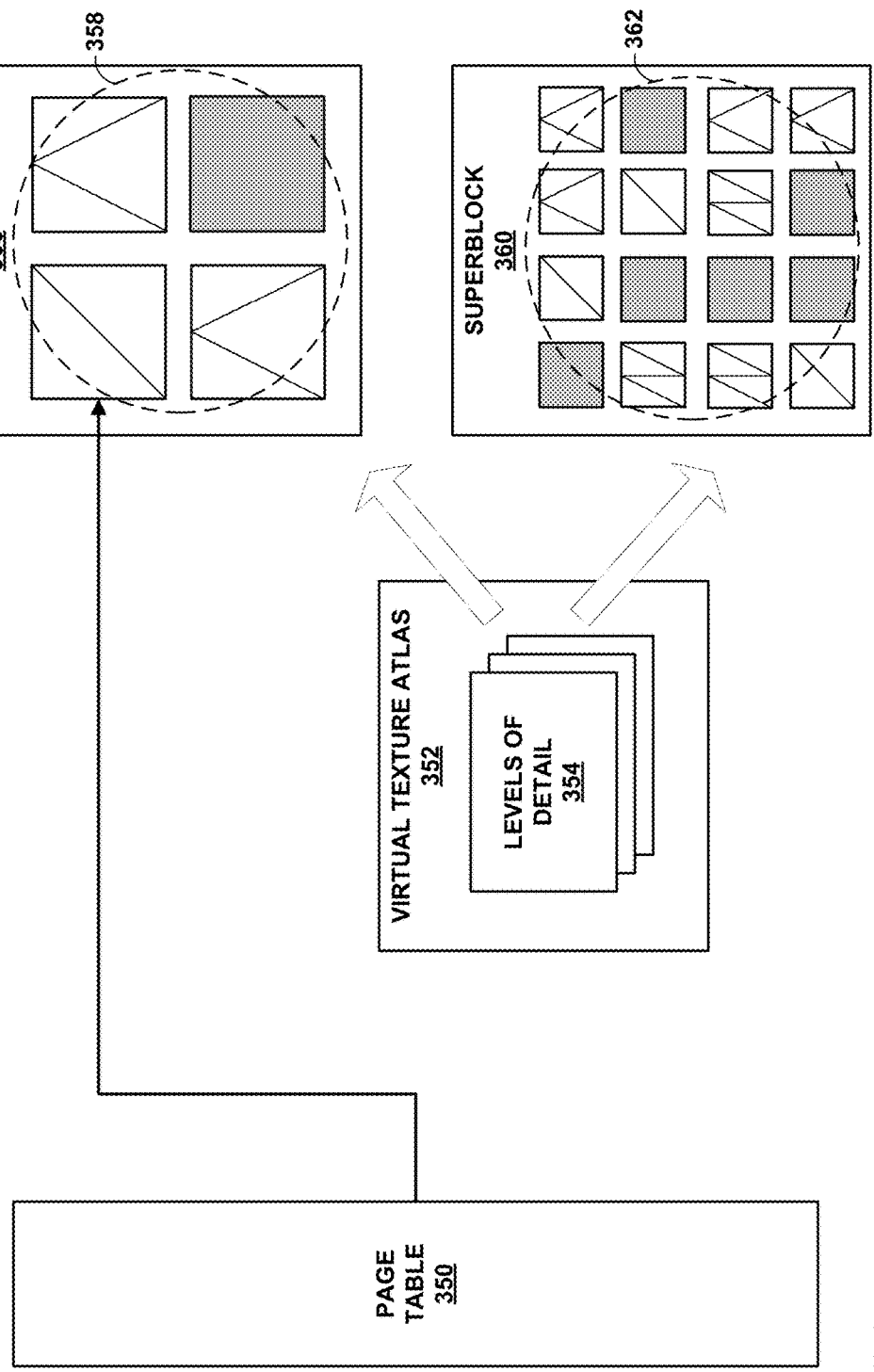
FIG. 5 is a conceptual diagram illustrating an example memory layout.

FIG. 5 is a conceptual diagram illustrating an example memory layout. The example of FIG. 5 includes page table 350, virtual texture atlas 352, and example superblocks 356, 360. Virtual texture atlas 352 includes various levels of detail (LODs) 354, each corresponding to one or more superblocks, such as superblocks 356, 360.

Virtual texture atlas 352 may also allocate memory for K superblocks of resolution 2N×2N, such as superblocks 356, 360. Each superblock may hold 22(N−M) texture blocks of mipmap level of detail (LOD) M, e.g., one of LODs 354. Metadata of superblocks may include the current one of LODs 354 and a free-block list.

Pagetable 350 is a lookup table including data mapping triangle indexes to texture coordinates. Pagetable 350 may store, for each triangle, a superblock identifier, a block identifier, and a triangle identifier (e.g., which triangle is in a particular strip). Data of pagetable 350 may fit into memory, so pagetable 350 need not be virtual. Pagetable 350 includes data that points from triangles to blocks, represented in FIG. 5 as facets 358, 362. The blocks may be allocated on demand (e.g., if corresponding triangles are visible). Thus, the memory requirements may be proportional to a conventional framebuffer. In this manner, virtual texture atlas 352 may reduce memory requirements, relative to conventional techniques prior to the techniques of this disclosure.

Server device 102 may perform atlas memory management operations as discussed below for virtual texture atlas 352. For example, server device 102 may perform offline preparation operations, e.g., clustering adjacent triangles into 2, 3, or 4 strips or fans, based on size and shape, and build a lookup table that maps triangle identifiers to cluster identifiers.

Once online, server device 102 may insert blocks. That is, if a triangle becomes visible, server device 102 may determine a desired one of LODs 354 of the triangle, and check in pagetable 350 if a cluster for the triangle is already present in virtual texture atlas 352. If the cluster is present and has the correct one of LODs 354, server device 102 need not take any further action. However, if the cluster is not present or the one of LODs 354 is too low, server device 102 may allocate a new block and enter the block into pagetable 350.

In online operation, server device 102 may also delete blocks. In particular, server device 102 may add the block to a free-block list, assuming pagetable 350 has been updated already. Server device 102 may delete blocks if all triangles in a cluster become invisible, if the one of LODs 354 changes and the corresponding entry in pagetable 350 is redirected to a different superblock, or if the payload expires after t frames and a forced refresh is needed.

Server device 102 may also perform a garbage collection operation for virtual texture atlas 352.

There may be at least one superblock for each of LODs 354, plus several spare superblocks. It is assumed that most triangles move in and out of virtual texture atlas 352 over a period of time. Server device 102 may dynamically assign spare superblocks to one of LODs 354 where needed. Garbage collection to empty and re-use a superblock may be performed in various modes. Server device 102 may perform gentle garbage collection, in which server device 102 does not allow any new blocks to be allocated and waits until resources are nearly drained. Alternatively, server device 102 may perform forced garbage collection, in which server device 102 migrates remaining resident blocks to other superblocks (amoritized over several frames). Alternatively, server device 102 may perform panic garbage collection, in which running out of superblocks prompts server device 102 to temporarily allocate a new block in a superblock with a lower one of LODs 354.

Figure 6:
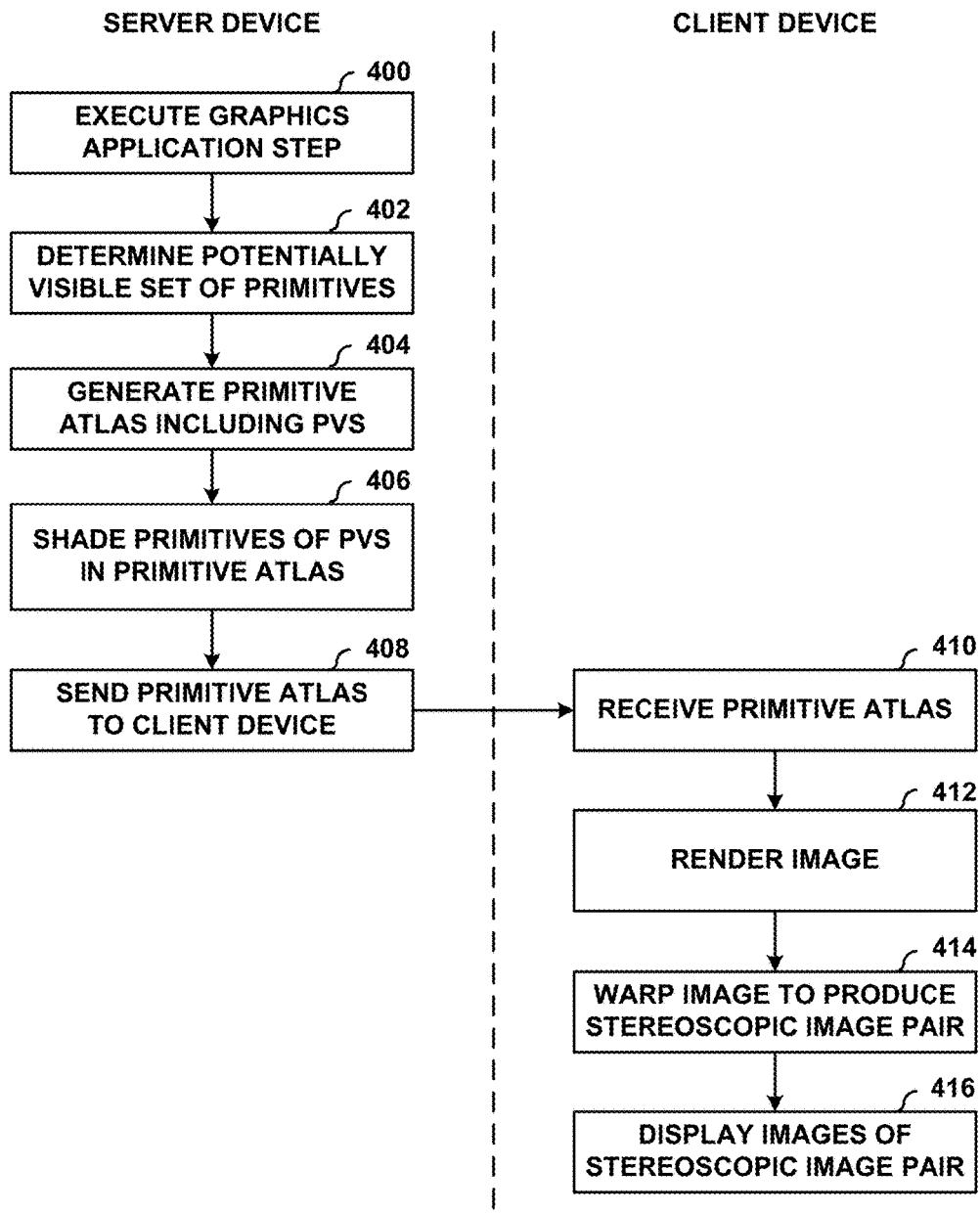
FIG. 6 is a flowchart illustrating an example process for rendering an image according to the techniques of this disclosure.

FIG. 6 is a flowchart illustrating an example process for rendering an image according to the techniques of this disclosure. Initially, CPU 104 of server device 102 executes a graphics application as part of a graphics application step of a graphics processing pipeline (400). By executing the graphics application, CPU 104 generates graphics objects and/or graphics primitives to be further processed as part of the graphics processing pipeline.

CPU 104 may provide the graphics objects and/or graphics primitives to graphics card 108. GPU 110 of graphics card 108 may then determine a potentially visible set (PVS) of primitives from a particular camera perspective (402). GPU 110 may then generate a primitive atlas including the primitives of the PVS (404). GPU 110 may also shade (by executing one or more shader programs) the primitives of the PVS in the primitive atlas (406). Ultimately, server device 102 may send the primitive atlas and any other necessary intermediate graphics data to a client device, e.g., VR headset device 120 (408).

VR headset device 120 may then receive the primitive atlas (410). GPU 126 of VR headset device 120 may render an image using the primitive atlas (412). GPU 126 may use the primitive atlas to produce a stereoscopic image pair including a left-eye image and a right-eye image (414). GPU 126 may store the left-eye image in framebuffer memory 130A and the right-eye image in framebuffer memory 130B. Left-eye display 132 may then display the left-eye image and right-eye display 134 may display the right-eye image, thereby displaying the images of the stereoscopic image pair (416).

In this manner, the method of FIG. 6 represents an example of a method of generating computer graphics, the method including determining, by a first graphics processing unit (GPU) of a first computing device, graphics primitives of a computer graphics scene that are visible from a camera viewpoint, generating, by the first GPU, a primitive atlas that includes data representing the graphics primitives that are visible from the camera viewpoint, shading, by the first GPU, the visible graphics primitives in the primitive atlas to produce a shaded primitive atlas, sending, by the first computing device, the shaded primitive atlas to a second computing device, and rendering, by a second GPU of the second computing device, an image or multiple images using the shaded primitive atlas.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of generating computer graphics, the method comprising:
   receiving, by a first graphics processing unit (GPU) of a first computing device, data representing a viewpoint of a second computing device wearable by a user;
   determining, by the first GPU, graphics primitives triangles of a computer graphics scene that are visible from a camera viewpoint corresponding to the viewpoint of the second computing device;
   generating, by the first GPU, a primitive atlas that includes data representing the graphics primitives triangles that are visible from the camera viewpoint, the primitive atlas including a list of the graphics primitives triangles;
   shading, by the first GPU, texels of the visible graphics primitives triangles in the primitive atlas to produce a shaded primitive atlas including a list of shaded graphics primitives triangles having a first resolution, without performing, by the first GPU, pixel shading on the shaded graphics primitives triangles; and
   sending, by the first computing device, the shaded primitive atlas, including the list of shaded graphics primitives triangles, to the second computing device, wherein a second GPU of the second computing device is configured to render an image using the shaded graphics primitives triangles of the shaded primitive atlas at a second resolution that is higher than the first resolution.

2. The method of claim 1, wherein determining the graphics primitives triangles that are visible comprises determining a potentially visible set (PVS) of graphics primitives triangles.

3. The method of claim 1, wherein generating the primitive atlas comprises assigning two or more of the graphics primitives triangles to each of a plurality of blocks in a virtual texture atlas.

4. The method of claim 1,
   wherein shading the visible graphics primitives triangles comprises shading only the visible graphics primitives triangles that have changed relative to visible graphics primitives triangles of an earlier computer graphics scene, and
   wherein sending the shaded primitive atlas comprises sending only the shaded visible graphics primitives triangles that have changed.

5. The method of claim 1, wherein the primitive atlas comprises a first primitive atlas, the method further comprising:
   shading visible graphics primitives of a subsequent computer graphics scene in a second primitive atlas;
   determining a difference between the first primitive atlas and the second primitive atlas;
   encoding data representing the difference; and
   sending the encoded data to the second computing device.

6. The method of claim 1, wherein rendering comprises:
   rendering, by the second GPU, a first image of a stereoscopic image pair using the primitive atlas; and
   rendering, by the second GPU, a second image of the stereoscopic image pair using the primitive atlas.

7. The method of claim 1, wherein the second GPU of the second computing device is further configured to perform foveated rendering, including sampling pixels at a center of the image more densely than pixels at a periphery of the image according to lens optics of the second computing device.

8. A system for generating computer graphics, the system comprising:
   a first computing device comprising a first graphics processing unit (GPU) implemented in circuitry, wherein the first GPU is configured to:
      receive data representing a viewpoint of a second computing device wearable by a user;
      determine graphics primitives triangles of a computer graphics scene that are visible from a camera viewpoint corresponding to the viewpoint of the second computing device;
      generate a primitive atlas that includes data representing the graphics primitives triangles that are visible from the camera viewpoint, the primitive atlas including a list of the graphics primitives triangles; and
      shade texels of the visible graphics primitives triangles in the primitive atlas to produce a shaded primitive atlas including a list of shaded graphics primitives triangles having a first resolution, without performing pixel shading on the shaded graphics primitives triangles,
   wherein the first computing device is configured to send the shaded primitive atlas, including the list of shaded graphics primitives triangles, to the second computing device, wherein a second GPU implemented in circuitry of the second computing device is configured to render an image or multiple images using the shaded graphics primitives triangles of the shaded primitive atlas at a second resolution that is higher than the first resolution.

9. The system of claim 8, wherein to determine the graphics primitives triangles that are visible, the first GPU is configured to determine a potentially visible set (PVS) of graphics primitives triangles.

10. The system of claim 8, wherein to generate the primitive atlas, the first GPU is configured to assign two or more of the graphics primitives triangles to each of a plurality of blocks in a virtual texture atlas.

11. The system of claim 8, wherein the first GPU is configured to shade only the visible graphics primitives triangles that have changed relative to visible graphics primitives triangles of an earlier computer graphics scene, and wherein the first computing device is configured to send only the shaded visible graphics primitives triangles that have changed.

12. The system of claim 8, wherein the primitive atlas comprises a first primitive atlas, wherein the first GPU is configured to:
   shade visible graphics primitives of a subsequent computer graphics scene in a second primitive atlas;
   determine a difference between the first primitive atlas and the second primitive atlas; and
   encode data representing the difference,
   wherein the first computing device is configured to send the encoded data to the second computing device.

13. The system of claim 8, wherein the second GPU is configured to:
   render a first image of a stereoscopic image pair using the primitive atlas; and render a second image of the stereoscopic image pair using the primitive atlas.

14. The system of claim 8, wherein the second GPU of the second computing device is further configured to perform foveated rendering, wherein to perform the foveated rendering, the second GPU is configured to sample pixels at a center of the image more densely than pixels at a periphery of the image according to lens optics of the second computing device.

15. A system for generating computer graphics, the system comprising:
    a first computing device; and
    wherein the first computing device comprises:
        means for receiving data representing a viewpoint of a second computing device wearable by a user;
        means for determining graphics primitives triangles of a computer graphics scene that are visible from a camera viewpoint corresponding to the viewpoint of the second computing device;
        means for generating a primitive atlas that includes data representing the graphics primitives triangles that are visible from the camera viewpoint, the primitive atlas including a list of the graphics primitives triangles;
        means for shading texels of the visible graphics primitives triangles in the primitive atlas to produce a shaded primitive atlas including a list of shaded graphics primitives triangles having a first resolution, without performing pixel shading on the shaded graphics primitives triangles; and
        means for sending the shaded primitive atlas, including the list of shaded graphics primitives triangles, to the second computing device, wherein the second computing device comprises means configured to render an image or multiple images using the shaded graphics primitives triangles of the shaded primitive atlas at a second resolution that is higher than the first resolution.

16. The system of claim 15, wherein the means for determining the graphics primitives triangles that are visible comprises:
    means for determining a potentially visible set (PVS) of graphics primitives triangles; and
    means for determining the graphics primitives triangles that are visible from the PVS.

17. The system of claim 15, wherein the means for generating the primitive atlas comprises means for assigning two or more of the graphics primitives triangles to each of a plurality of blocks in a virtual texture atlas.

18. The system of claim 15,
    wherein the means for shading the visible graphics primitives triangles comprises means for shading only the visible graphics primitives triangles that have changed relative to visible graphics primitives triangles of an earlier computer graphics scene, and
    wherein the means for sending the shaded primitive atlas comprises means for sending only the shaded visible graphics primitives triangles that have changed.

19. The system of claim 15, wherein the primitive atlas comprises a first primitive atlas, further comprising:
    means for shading visible graphics primitives of a subsequent computer graphics scene in a second primitive atlas;
    means for determining a difference between the first primitive atlas and the second primitive atlas;
    means for encoding data representing the difference; and
    means for sending the encoded data to the second computing device.

20. The system of claim 15, wherein the means for rendering comprises:
    means for rendering a first image of a stereoscopic image pair using the primitive atlas; and
    means for rendering a second image of the stereoscopic image pair using the primitive atlas.

21. The system of claim 15, wherein the second computing device further comprises means configured to perform foveated rendering, including means for sampling pixels at a center of the image more densely than pixels at a periphery of the image according to lens optics of the second computing device.

22. A non-transitory computer-readable medium having stored thereon instructions that, when executed, cause a graphics processing unit (GPU) of a computing device to:
    receive data representing a viewpoint of a second computing device wearable by a user;
    determine graphics primitives triangles of a computer graphics scene that are visible from a camera viewpoint corresponding to the viewpoint of the second computing device;
    generate a primitive atlas that includes data representing the graphics primitives triangles that are visible from the camera viewpoint, the primitive atlas including a list of the graphics primitives triangles;
    shade texels of the visible graphics primitives triangles in the primitive atlas to produce a shaded primitive atlas including a list of shaded graphics primitives triangles having a first resolution, without performing pixel shading on the shaded graphics primitives triangles; and
    send the shaded primitive atlas, including the list of shaded graphics primitives triangles, to the second computing device, the second computing device configured to render an image using the shaded graphics primitives triangles of the shaded primitive atlas, the image having a second resolution that is higher than the first resolution and pixels at a center of the image sampled more densely than pixels at a periphery of the image according to lens optics of the second computing device.

23. The non-transitory computer-readable storage medium of claim 22, wherein the instructions that cause the GPU to determine the graphics primitives triangles that are visible comprise instructions that cause the GPU to:
    determine a potentially visible set (PVS) of graphics primitives triangles; and
    determine the graphics primitives triangles that are visible from the PVS.

24. The non-transitory computer-readable storage medium of claim 22, wherein the instructions that cause the GPU to generate the primitive atlas comprise instructions that cause the GPU to assign two or more of the graphics primitives triangles to each of a plurality of blocks in a virtual texture atlas.

25. The non-transitory computer-readable storage medium of claim 22,
    wherein the instructions that cause the GPU to shade the visible graphics primitives triangles comprise instructions that cause the GPU to shade only the visible graphics primitives triangles that have changed relative to visible graphics primitives triangles of an earlier computer graphics scene, and
    wherein the instructions that cause the GPU to send the shaded primitive atlas comprise instructions that cause the GPU to send only the shaded visible graphics primitives triangles that have changed.

26. The non-transitory computer-readable storage medium of claim 22, wherein the primitive atlas comprises a first primitive atlas, further comprising instructions that cause the GPU to:
- shade visible graphics primitives of a subsequent computer graphics scene in a second primitive atlas;
- determine a difference between the first primitive atlas and the second primitive atlas;
- encode data representing the difference; and
- send the encoded data to the second computing device.

* * * * *